Patented May 17, 1927.

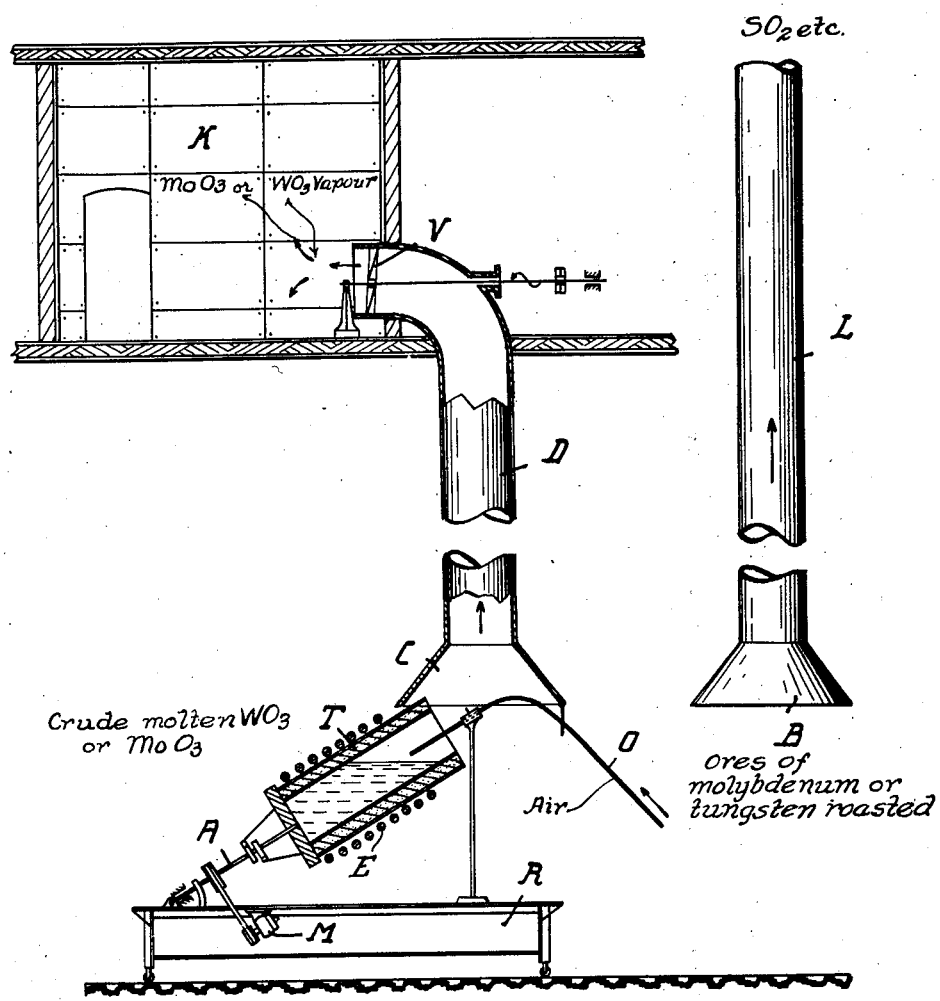

1,629,004

UNITED STATES PATENT OFFICE.

PAUL SCHWARZKOPF, OF BERLIN-CHARLOTTENBURG, GERMANY.

PROCESS FOR THE PRODUCTION OF MOLYBDENUM TRIOXIDE AND TUNGSTEN TRIOXIDE.

Application filed July 23, 1926, Serial No. 124,350, and in Germany April 26, 1926.

The invention relates to a process for the production of molybdenum trioxide ($MoO_3$) and tungsten trioxide ($WO_3$) in an extremely pure state directly from the ore, and also to an apparatus suitable for carrying out the said process.

It is known that molybdenite ($MoS_2$) and wulfenite ($PbMoO_4$) are ores which contain molybdenum, while scheelite ($CaWO_4$) and wolframite ($FeWO_4$) contain tungsten. The usual method adopted in working up these minerals is to subject the ores which have been refined and concentrated as much as possible by mechanical means, either alone or with suitable additions, to an annealing process in order to convert the tungsten or molybdenum in the ores into ammonium or alkali tungstate or molybdate, which is soluble in water, from which after suitable purification the desired tungsten trioxide or molybdenum trioxide is obtained by decomposing with mineral acids.

For example, molybdenum trioxide is obtained from molybdenite by the following method. After the ores have been refined and concentrated, the molybdenum sulphide in the same is converted by roasting into molybdenum trioxide and the latter is dissolved out of the roasted mass by ammonia. The molybdenum trioxide is then extracted from the ammoniacal solution either by precipitating with mineral acids and subsequent calcining or by decomposing the crystallized and recrystallized ammonium molybdate by a direct calcining process. Wulfenite is converted, after concentration, into molybdenum sulphide by melting with alkali carbonates, sulphur and carbon, this sulphide being also roasted and further treated as described in connection with the molybdenite.

In the production of tungsten trioxide, for example from wolframite, a disintegrating process is carried out by calcining with soda, lixiviating with water, then purifying the resulting sodium tungstate solution, precipitating the tungsten trioxide hydrate from the hot solution with nitric acid and converting the hydrate into $WO_3$ by calcination.

Irrespective of whether the molybdenum trioxide or tungsten trioxide is obtained in one of the methods described or by any other known chemical means, it is always produced finally from alkali or ammonium molybdates or tungstates, into which the molybdenum or tungsten in the ore had first of all to be converted, as these compounds can be easily recrystallized and therefore afford the greatest security that the products will be obtained in a very pure form. However, the oxides obtained are never absolutely pure, although they are placed on the market as chemically pure. In addition to ammonia or alkali they also contain small quantities, or traces at least, of iron and other impurities.

It is a fact that even the slightest trace of impurities may be detrimental when the molybdenum trioxide and tungsten trioxide are used for certain purposes, for instance when they are worked up into wires and sheet metal for incandescent lamps, Röntgen tubes and electron tubes, and this detrimental effect would be evident even if the impurities in the acid only amounted to a percentage of hundredths. Moreover, all the methods of production carried out in practice today are relatively very expensive. For example, the cost of extracting molybdenum trioxide ($MoO_3$) amounts, according to the method applied, to about 60-80% of the value of the $MoO_3$ in the concentrated ore.

Therefore, attempts have been made for some time to obtain these by a simple process direct from the ore. Endeavors of this kind are known more especially for obtaining molybdenum trioxide.

Wöhler has already described in 1856, in the "Annalen der Chemie und Pharmacie,' a process for obtaining molybdenum trioxide from the natural molybdenum sulphide, consisting in heating the molybdenite in large pieces in a glass tube, through which a stream of atmospheric air is passed until the last residue of molybdenum sulphide is oxidized and therewith sublimated into bright clear crystals. However simple this process, which Wöhler naturally only proposed for use in the laboratory, it was not possible actually to obtain pure molybdenum trioxide by this means, although Wöhler's suggestion was taken up by the most famous chemists who succeeded him. For instance, Debray points out in 1868 that it would be of great advantage for determining the atomic weight of molybdenum, if it were possible to make ues of Wöhler's suggestion for producing absolutely pure molybdenum trioxide. However, in repeating Wöhler's experiments he finds that the sublimated oxide at its temperature of condensation, attacks glass and thus always contains silica. Debray therefore uses a platinum tube instead of the glass tube employed by Wöhler, but then obtains a molybdenum trioxide which has such a small density and consequently such a large volume, that Debray was obliged to dissolve it again in ammonia, in order to concentrate it. However, this method introduces another impurity into the product, which can only be purified with great difficulty on a small scale in the laboratory, so that Debray's process is impracticable for the technical production of molybdenum trioxide on a large scale. This is the reason why Moisson still says in 1905 that the molybdenum anhydride obtained according to Wöhler's process is not pure.

It may be mentioned here that similarly to the practice adopted commercially, tungsten trioxide and molybdenum trioxide are understood in this case as referring to $WO_3$ and $MoO_3$. Theoretical chemistry refers to these "compounds" as "acid anhydrides."

Finally, Wöhler's suggestion for obtaining molybdenum trioxide is taken as basis in the U. S. Patent 1,118,150 of 1914, which proposes to pulverize molybdenite and heat it at temperatures above 790° C. in an atmosphere which contains oxygen in excess; the sublimated molybdenum trioxide is collected in bag filters. However, in order to be able to sublimate molybdenum trioxide in this manner, it is not possible to exceed a temperature of 800° C. for reasons which will be reverted to later. In view of the extreme importance of obtaining the molybdenum trioxide in the purest form for the branches of industry previously referred to, this process has also been observed and tested. It has been found, however, as Ullmann says in his "Enzyclopädie der technischen Chemie," vol. 8, page 186, that it is very difficult to carry out this process in practice, and moreover the resulting molybdenum trioxide has the disadvantage which had previously been discovered by Debray, that it is not sufficiently dense and cannot therefore be used for the production of incandescent filaments. Moreover, the molybdenum trioxide obtained by this last method is not as pure as was expected. In the first place, it is stated in the said patent itself that the molybdenum trioxide obtained is very pure but can be further purified by similar re-sublimation by repeating the process.

Applicant has been able to discover the reasons why Wöhler's suggestion of 70 years ago, although it has been repeatedly taken up by those engaged in the art, has led to no result and no method has been formulated which will assure extremely pure molybdenum trioxide being produced on a commercial scale. Wöhler and his successors all pass a current of air, in some cases with an excess of oxygen, over the finely divided ore during roasting. In such a case it is impossible to avoid fine particles of the molybdenite, some in the roasted state and some not yet roasted, being carried along with the sublimated molybdenum trioxide and conveyed into the condensing chamber or the like, in which these impurities settle together with the oxide. This action is further assisted in the cases in which oxygen is employed, by the fact that the oxygen supplied causes an explosive-like combustion of the molybdenite to take place, whereby very fine particles are broken off and may be carried along for some distance by the stream of air. If it is taken into consideration that 0.01% ferric oxide, that is to say 10 grs. ferric oxide to 100 kgs. molybdenum trioxide or tungsten trioxide, are sufficient to make the trioxide unsuitable for certain industrial purposes, more especially however for those referred to above, it is easily seen that the process described above causes impurities to be introduced into the oxide, in a quantity which would greatly exceed the permissible limit. Moreover, in carrying out the roasting process, sulphurous and sulphuric acids are formed at the same time as the sublimation takes place; these acids are absorbed by the fine condensing molybdenum trioxide and in coming into contact with metal parts of the apparatus, ventilators, pipe conduits and the like, cause foreign substances to be introduced into the oxide. Another reason for these impurities is that already discovered by Debray, viz, that the sublimated molybdenum trioxide is rendered impure by the materials of the furnace and filter chamber.

My invention obviates the drawbacks of the processes referred to and makes it possible for the molybdenum trioxide to be produced directly from the ore on a large scale in the factory. It is at least as simple as the process described in the U. S. patent and produces the purest tungsten trioxide and molybdenum trioxide at minimum cost. The resulting oxides are sufficiently dense, so that the tungsten trioxide can be worked up without any difficulty for the production of filaments for electric incandescent lamps, Röntgen tubes, electron tubes and the like and is in a purer state than has ever been obtained on a large scale or scarcely even in small quantities in laboratories. The resulting molybdenum trioxide, for example dissolves in ammonia, forming an absolutely clear solution which contains no impurities of sulphurous or sulphuric acid and is therefore actually quite pure.

My invention involves melting the ore, in the case of molybdenum after it has been at least partially roasted, in order that the molybdenum trioxide or tunsten trioxide then already in a free state in the molten mass, or liberated at definite temperatures, may be extracted by evaporation and subsequent condensation.

Since in my new method, or the apparatus constructed for carrying it out, the evaporated molybdenum trioxide or tungsten trioxide leaves the evaporating zone at the same moment in which it has been converted into vapour, it does not come into contact with any hot furnace walls, as is unavoidable in the case of the process disclosed in the U. S. patent, in which the oxide sweeps along the hot furnace tubes and may absorb substances from the material of which the tubes are made. Furthermore sulphurous or sulphuric acid does not penetrate into the condensing space and consequently the material composing the furnace, tube and filter cannot be attacked in any way thereby, which might also cause damage to these parts of the apparatus as well as introduce impurities into the molybdenum trioxide and tungsten trioxide formed. Moreover, all additional impurities contained in the ore are naturally retained in the melt. It is quite impossible for such impurities, viz, very small particles of the finely divided ore, to be carried along in the manner referred to. The oxide obtained by evaporation from the melt, condenses from a vapour phase of substantially higher density than could ever be produced by sublimation, and the grain of the condensed oxide is therefore completely different from that of the sublimated oxide. Oxygen is not employed at all, which not only means a saving in expense, but also assures that the process according to the invention will have a satisfactory result, as oxygen is to be considered as detrimental.

In comparison with all known processes of this kind the invention entails the further advantage that waste material from the manufacture of bars and wires, as well as all other products containing molybdenum or tungsten, can be added to the ore to be worked up; they are introduced into the molten mass in such a quantity as would be soluble therein under the particular conditions prevailing.

A description will now be given of a form of carrying out the process according to the invention, as applied to the production of molybdenum trioxide.

As primary material use is made of partially or completely roasted molybdenite or those molybdenum products which contain such an amount of molybdenum trioxide that upon being heated to temperatures of about 1000° C. they pass entirely into the molten mass. The treatment of these products will now be illustrated by means of the constructional example shown diagrammatically in the drawing, which shows an elevation partly in section through an apparatus suitable for carrying out the process.

The wholly or partially roasted molybdenum products are introduced into a cylindrical quartz crucible T, in any case however into a crucible which is made of a non-metallic material impervious to the melted mass; the molybdenum products are heated in this crucible to temperatures of 1000° C. and over, for example by means of a metal coil E wound around the outside of the crucible and traversed by electric current. During this heating the crucible is set into continuous slow rotation. It is mounted upon an inclined axis A which preferably makes an angle of 45° with the horizontal and is driven by an electromotor or the like M. It has been found that the process can be carried out all the more successfully the more acute is the angle which the axis A makes with the horizontal. It is limited by the fact that naturally the mass in the crucible must not be allowed to flow out. The effect of this inclined position of the crucible is to give a large (elliptical) surface to the material which is being melted; the rotation causes the viscous melt to be carried along by the crucible walls and be as it were stirred round, so that fresh parts of the melt are continually coming into contact with the outside air. By this means in the first stage of operation, any sulphide still present in the molybdenite is completely oxidized to molybdenum trioxide, and in the second stage the largest possible surface is available for the evaporation.

The crucible with its drive is mounted on a movable frame R, which in this stage of the process is not in the position shown but displaced to the right to such an extent that the opening of the crucible T lies below or in the funnel B, from which a conduit for instance leads into the open air. In this stage of the process no molybdenum trioxide is yet evaporating or at any rate only in the very smallest and therefore absolutely negligible quantities.

With a properly dimensioned crucible a treatment of about ½–2 hours will be sufficient to convert all the molybdenum sulphide present in the ore into molybdenum trioxide, which will be evident from the fact that no more sulphuric acid vapours escape from the crucible.

The frame R with the crucible is now pushed to the left under the hood C, into the position shown. Through the tube O a powerful current of air is blown over the surface of the molten mass.

The effect of this current of air is that an extremely vigorous evaporation of the molybdenum trioxide commences immediately.

Through the current of air, which may be further assisted by a suction fan V at the upper end of the drawing-off pipe D, the vapourized molybdenum trioxide is carried at a great speed into the chamber K, in which owing to a decrease in the speed, it condenses from the vapourized state; owing to the considerable draught in the pipe D it is impossible for condensation to take place there to any appreciable extent.

In the chamber K the cooled oxide falls like snow on the bottom, without coming into contact with any foreign substances. The amount of oxide which settles immediately on the bottom and on the walls of the chamber is naturally so small that any possible impurities in these outside layers are negligible, and even if these outside layers should be conveyed away with the absolutely pure layers lying above them, they cannot have any appreciable effect upon the purity of the oxide. Moreover, it is not necessary to fear any impurities of this kind, as no chemical reaction can take place between the cold oxide and the walls of the chamber and there is no sulphuric acid present, and impurities of a merely mechanical nature can be avoided by lining or coating the chamber with sheets of glass.

The oxide collected in the chamber K is accordingly in the perfectly pure state which has been aimed at for so many years. In addition, its fineness and state of division make it preeminently suitable for the production of metallic powder for the manufacture of wires, even those of finest diameter and more especially for ductile sheet metal. Although it is obtained in a loose state it is nevertheless sufficiently dense to produce metallic powder of very high quality. In special cases it is sufficient to pass it through agate or steel rollers, exerting a mutual pressure of about 70 kgs., a density being obtained which is not less than that of the oxide hitherto produced exclusively by wet processes. In spite of this the grain of the oxide obtained according to the invention is considerably finer than that of the oxide produced by wet processes, which in conjunction with the high purity of the oxide is of very great advantage for the further working up into wires and sheet metal.

A further advantage of the fine grain obtained is that when the oxide is reduced to pure metal, the attacking surfaces for the hydrogen are considerably increased as compared with a coarser grain, which makes it possible for the hydrogen on the one hand to be more fully utilized and on the other hand to be passed at a substantially reduced speed through the stratified oxide. Consequently there is a considerable saving in hydrogen when the oxide produced according to the invention is further worked up. The inventor has found in practice that when the reducing tube has a diameter of 56 mms. and oxide contained in the carrier is continually passed through the tube according to the counter current principle, a velocity of flow of 1 m. per minute of the hydrogen is sufficient to obtain the fine-grained metal required for further working up into very fine wires, if a molybdenum trioxide produced according to the present invention is employed; but when use is made of the best molybdenum trioxide hitherto obtainable on the market it is necessary for working up the same amount of acid and under otherwise equal conditions, to employ a velocity of flow of the hydrogen of 5, 8 ms. per minute to obtain a metal suitable for further working up into finest wires, etc. The fineness of the grain in the latter case is, however, considerably less than when the oxide produced according to the invention is worked up with a fraction of the quantities of hydrogen hitherto required.

A fine pure metallic powder can be obtained at a low cost according to the invention and can be far more satisfactorily sintered than the finest-grained metallic powder hitherto obtainable, which is nevertheless coarser than that which can be reduced from an oxide produced according to the invention. The finer the metallic powder employed, the less is the energy required for producing a sintered bar from the bar obtained by pressure from the powder. Assuming an equal pressure and equal weight of the pressed bars, the voltage and intensity of current required for the sintering is considerably less the finer-grained is the pressed bar. If, for example 55 kilowatt hours electric energy were required for sintering the usual type of pressed bars, the same sintering can be carried out, when working up an oxide according to the invention, with only 22 kilowatt hours electric energy; the resulting sintered bars then possess an equally fine-grained structure. Moreover, when sintering absolutely pure oxide it is possible to employ temperatures very near to the melting point, whereas in the case of oxides containing only a few hundredths percent impurities, there is no possibility of using such high temperatures during the sintering, as parts inside the bar may become melted. The higher the sintering temperature the sooner is the sintering process ended and the greater is the output and utilization of an ordinary sintering plant. The inventor was able in practice to obtain an increased output of about 66% by this method.

The process according to the invention can be carried out without any difficulty on the smallest and largest scales, requires no trained staff and can be carried out with 20% of the labor, which has hitherto been required for the same purpose in an average-sized factory. Also, the size of the work-rooms required is decreased up to 10% as compared with those hitherto required.

The process according to the invention can be carried out advantageously at the mine itself. If the ore were to be conveyed from the mine to works some distance away the cost of transporting the weight in crude rock would be equal to that which would have to be expended for working up the roasted molybdenite into oxide at the mine itself. The finished pure molybdenum trioxide could then be placed on the market at the same or very little higher price than that hitherto charged for the ore alone at a place some distance from the mine.

In addition to the advantages of substantially higher purity and greater density resulting from the process according to the invention, more especially as compared with that of the said U. S. patent, the producing plant itself is much simpler, easier to work and incomparably cheaper. Furthermore, higher temperatures of 1000–1100° C. and more, can be used in treating the molybdic compounds as compared with the temperatures used in the other case, which as already mentioned can be carried out at most at 800° C., as otherwise it approaches too near to the melting point and the molten mass would flow out of the inclined retorts used in that case which are necessarily open at the lowest point. Finally, no addition of oxygen is used in the present invention, so that therefore the cost of the oxygen prepared in cylinders or where these are not obtainable, the erection of a special plant for producing oxygen, is saved in advance.

The example which has just been described can also be applied to the production of tungsten trioxide, $WO_3$. Naturally a correspondingly higher melting temperature must then be adopted and therefore a crucible of zirconium oxide, for example, should be used instead of a quartz crucible.

Fundamentally the invention can be suitably applied to the production of all volatile oxides, which melt after they volatilize. The invention is especially adapted for use in connection with ores, the evaporating and melting points of which closely approximate each other. When used in connection with ores whose evaporating and melting points differ widely, some additional means well known to those skilled in the art must be used, such, for example, as controlling the pressure in the container for the ore.

Finally it may be pointed out that naturally it is also possible to carry out a continuous process if, for instance the frame R is arranged so as to be capable of rotating and two crucibles T provided thereon in such a manner that one crucible is under the outlet B—L and the ore is melted therein while the other crucible is under the hood C and the molybdenum trioxide or tungsten trioxide evaporated therefrom. Should it be impossible to arrange for the times taken by these two processes to coincide, the process can be carried out in a continuous manner by providing a suitably large number of crucibles for example on a rotary table and suitably increasing the one or other kind of outlet. In that case either the ore is simultaneously melted in several crucibles or the oxide simultaneously evaporated from several crucibles. In order to avoid moving the containers (crucibles) and in order to prevent in part the provision of two different outlets, the crucible or the container may also be arranged fixed under one single outlet, which is forked at a suitable point and on the one hand leads to the condensing chamber and on the other hand to the open air or any other suitable place, and devices, for instance flap valves may be provided at the point of bifurcation, which during the heating or melting of the ore lead the resulting vapors into the open air, but while the molybdenum trioxide or tungsten trioxide is evaporating lead these vapors into the condensation chamber. The complete separation of the outlets is however decidedly to be preferred for assuring the absolute purity of the oxide obtained.

The introductory clause of the appended claims is intended to indicate that the method is applicable to the production of either molybdenum trioxide or tungsten trioxide.

What I claim is:—

1. In a process for the production of molybdenum trioxide and tungsten trioxide from their ores, melting the respective ore and evaporating the oxide from the ore while in the molten state.

2. In a process for the production of molybdenum trioxide and tungsten trioxide from its ore, roasting and subsequently melting the ore and condensing the oxide vapors evaporating from the ore while in the molten state.

3. A process for the production of molybdenum trioxide and tungsten trioxide from their ores, consisting in melting the ore and driving off the oxide vapors by means of a current of air.

4. A process for the production of molybdenum trioxide and tungsten trioxide from their ores, consisting in melting the ore and withdrawing by suction the oxide vapors evolved from the molten mass.

5. A process for the production of tungsten trioxide and molybdenum trioxide from their ores, consisting in melting the ore in one stage and removing the vapors in a subsequent stage, while maintaining the heat of the ore.

6. A process for the production of tungsten trioxide and molybdenum trioxide from their ores, consisting in melting the ore, evaporating the oxide from the molten mass, conveying the evaporated oxide without contacting any heated parts into a condensing space, and precipitating the oxide in said space.

In testimony whereof I have signed my name to this specification.

PAUL SCHWARZKOPF.